(12) United States Patent
Fujii et al.

(10) Patent No.: US 8,037,218 B2
(45) Date of Patent: Oct. 11, 2011

(54) COMMUNICATION APPARATUS AND METHOD

(75) Inventors: Kenichi Fujii, Katsushika-ku (JP); Takatoshi Hirose, Yokohama (JP); Hidetada Nago, Kawasaki (JP); Takahiro Shichino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 11/376,796

(22) Filed: Mar. 15, 2006

(65) Prior Publication Data

US 2006/0212611 A1    Sep. 21, 2006

(30) Foreign Application Priority Data

Mar. 15, 2005    (JP) ................. 2005-073953

(51) Int. Cl.
*G06F 5/00* (2006.01)
*H04L 12/42* (2006.01)

(52) U.S. Cl. ......................... 710/38; 370/328
(58) Field of Classification Search .................. 710/38, 710/100
See application file for complete search history.

(56) References Cited

U.S. PATENT DOCUMENTS

| | | | |
|---|---|---|---|
| 5,699,511 A | 12/1997 | Porcaro et al. | |
| 5,708,820 A | 1/1998 | Park et al. | |
| 5,754,752 A | 5/1998 | Sheh et al. | |
| 6,038,225 A | 3/2000 | Nago | |
| 6,141,719 A * | 10/2000 | Rafferty et al. | 710/316 |
| 6,157,465 A | 12/2000 | Suda et al. | |
| 6,205,502 B1 * | 3/2001 | Endo et al. | 710/100 |
| 6,477,570 B1 | 11/2002 | Takayama et al. | |
| 6,529,522 B1 | 3/2003 | Ito et al. | |
| 6,560,662 B1 | 5/2003 | Sakai | |
| 6,603,744 B2 * | 8/2003 | Mizutani et al. | 370/310 |
| 6,697,618 B1 | 2/2004 | Bullock et al. | |
| 6,756,898 B2 | 6/2004 | Ikematsu | |
| 6,839,344 B1 | 1/2005 | Couillaud et al. | |
| 6,912,651 B1 * | 6/2005 | Hamdi et al. | 713/1 |
| 7,010,638 B2 * | 3/2006 | Deng et al. | 710/306 |
| 7,024,501 B1 | 4/2006 | Wright | |
| 7,151,949 B2 | 12/2006 | Cavill et al. | |
| 7,162,555 B2 | 1/2007 | Kim et al. | |
| 7,200,685 B2 | 4/2007 | Uemura | |

(Continued)

FOREIGN PATENT DOCUMENTS

CN        1132381        12/2003

(Continued)

OTHER PUBLICATIONS

Communication from the European Patent Office dated Nov. 5, 2007 forwarding European Search Report for application No. 06251338.7-2212.

(Continued)

*Primary Examiner* — Henry Tsai
*Assistant Examiner* — Titus Wong
(74) *Attorney, Agent, or Firm* — Cowan, Liebowitz & Latman, P.C.

(57) ABSTRACT

A method of communication in a communication apparatus includes steps of suppressing communication with a first communication device, which has been connected to a first communication interface, in accordance with data from the first communication device; establishing communication with a second communication device by a second communication interface; removing suppression of communication with the first communication device after communication with the second communication device has been established; and communicating data between the first and second communication devices via the first communication and second communication interfaces.

8 Claims, 15 Drawing Sheets

U.S. PATENT DOCUMENTS

| | | | |
|---|---|---|---|
| 7,207,059 B1 | 4/2007 | Kurian et al. | |
| 7,233,408 B2 | 6/2007 | Henderson et al. | |
| 7,353,391 B2 | 4/2008 | Sato et al. | |
| 7,373,434 B2 | 5/2008 | Yoshida et al. | |
| 7,428,209 B1 | 9/2008 | Roberts | |
| 7,453,880 B2 | 11/2008 | Tanaka | |
| 7,689,223 B1 | 3/2010 | Lewis | |
| 7,831,282 B2 | 11/2010 | Luebke et al. | |
| 2001/0009018 A1 | 7/2001 | Iizuka | |
| 2002/0132603 A1 | 9/2002 | Lindskog et al. | |
| 2002/0147816 A1 | 10/2002 | Hlasny | |
| 2002/0166080 A1 | 11/2002 | Attanasio et al. | |
| 2002/0196769 A1 | 12/2002 | Ohmi et al. | |
| 2003/0012132 A1 | 1/2003 | Novaes | |
| 2003/0086388 A1* | 5/2003 | Peters et al. | 370/328 |
| 2003/0110319 A1 | 6/2003 | Kim et al. | |
| 2003/0195983 A1 | 10/2003 | Krause | |
| 2003/0224820 A1 | 12/2003 | Einola et al. | |
| 2004/0088449 A1 | 5/2004 | Sakaki | |
| 2004/0122649 A1 | 6/2004 | Bartek et al. | |
| 2004/0218204 A1 | 11/2004 | Nomura | |
| 2004/0218209 A1 | 11/2004 | Hamaguchi et al. | |
| 2004/0223180 A1 | 11/2004 | Brooks | |
| 2004/0260745 A1 | 12/2004 | Gage et al. | |
| 2004/0266386 A1 | 12/2004 | Kuo | |
| 2005/0048920 A1 | 3/2005 | Liu | |
| 2005/0048953 A1 | 3/2005 | Ohara | |
| 2005/0052690 A1 | 3/2005 | Masumoto et al. | |
| 2005/0059386 A1 | 3/2005 | Li | |
| 2005/0060419 A1 | 3/2005 | Fujii et al. | |
| 2005/0066197 A1 | 3/2005 | Hirata et al. | |
| 2005/0088689 A1 | 4/2005 | Suga et al. | |
| 2005/0091437 A1 | 4/2005 | Yang et al. | |
| 2005/0194446 A1 | 9/2005 | Wiklof et al. | |
| 2005/0197093 A1 | 9/2005 | Wiklof et al. | |
| 2005/0289257 A1 | 12/2005 | Fink | |
| 2006/0020723 A1 | 1/2006 | Chia-Chun | |
| 2006/0091437 A1 | 5/2006 | Hong et al. | |
| 2006/0161793 A1 | 7/2006 | Orr | |
| 2006/0200563 A1 | 9/2006 | Hirosw | |
| 2006/0200564 A1 | 9/2006 | Watanabe et al. | |
| 2006/0206592 A1 | 9/2006 | Fujii et al. | |
| 2006/0246946 A1 | 11/2006 | Moritomo et al. | |
| 2006/0246947 A1 | 11/2006 | Fujii et al. | |
| 2006/0248581 A1 | 11/2006 | Sundarrajan et al. | |
| 2006/0253605 A1 | 11/2006 | Sundarrajan et al. | |
| 2006/0268744 A1 | 11/2006 | Sakai et al. | |
| 2007/0002867 A1 | 1/2007 | Shitano et al. | |
| 2007/0230393 A1 | 10/2007 | Sinba et al. | |

FOREIGN PATENT DOCUMENTS

| | | |
|---|---|---|
| EP | 0169244 B | 7/1991 |
| JP | 09-153897 A | 6/1997 |
| JP | 10-257119 | 9/1998 |
| JP | 11-239312 A | 8/1999 |
| JP | 2000-209238 A | 7/2000 |
| JP | 2002-118577 A | 4/2002 |
| JP | 2002-202835 A | 7/2002 |
| JP | 2003-087276 A | 3/2003 |
| JP | 2003-110585 A | 4/2003 |
| JP | 3094734 U | 7/2003 |
| JP | 2003-263253 A | 9/2003 |
| JP | 2004-005541 A | 1/2004 |
| JP | 2004-009388 A | 1/2004 |
| JP | 3530847 | 3/2004 |
| JP | 2004-171158 A | 6/2004 |
| JP | 2005-011246 A | 1/2005 |
| JP | 2005-044094 A | 2/2005 |
| KR | 1985-7000172 A | 10/1985 |
| KR | 2005-0102824 A | 10/2005 |
| KR | 2005-0119407 A | 12/2005 |
| KR | 2006-0079516 A | 7/2006 |
| WO | WO 00/42740 | 7/2000 |
| WO | 01/48613 | 7/2001 |
| WO | 03/052606 | 6/2003 |

OTHER PUBLICATIONS

Chinese Office Action Issued on May 9, 2008 on a corresponding counterpart Chinese Application No. 200610064831.

The above foreign references # 1- # 3 were cited in a May 8, 2009 Japanese Office Action that issued in Japanese Patent Application No. 2005-073953, of which is enclosed without English Translation.

Axis Communications AB: "Axix 5810—A Bluetooth tm Print Plug" {Online} 2002, XP002389023 Retrieved from the Internet: URL:http://www.axis.com/techsup/prtsrv/axis_5810/index.htm?tab=product_info>.

FotoNation: "Fotonation Printer Dongle" {Online} 2006, XP002389024 Retrieved from the Internet: URL:http://www.fotonation.com/pmapress/Information_leaflets/Fotonation_PrinterDongle.pdf>.

Mobile Printing—Today and in the future, White Paper Axis Communications, Network Print Servers, Ref: 1.1, Last updated Feb. 5, 2001.

The above U.S. Patents 1-7, U.S. Publications 1-2, and foreign Document were cited in a Mar. 26, 2009 US Office Action that issued in related U.S. Appl. No. 11/376,785, of which is enclosed and all remaining documents were cited in a May 5, 2009 US Office Action that issued in related U.S. Appl. No. 11/373,196, of which is enclosed.

Human English tranlsation of Japanese Document No. 2005-011246, published Jan. 13, 2005.

Human English tranlsation of Japanese Document No. 3094734 published Jul. 4, 2003.

He above references were cited in a Dec. 10, 2009 US Office Action that issued in related U.S. Appl. No. 11/373,196, of which is enclosed.

The above references were cited in a Nov. 2, 2009 Japanese Office Action of which is not enclosed, that issued in Japanese Patent Application No. 2005-073949.

Petronel Bigioi et al.,PTP/IP—A New Transport Specification for Wireless Photography, IEEE Transactions on Consumer Electronics, vol. 51, No. 1, pp. 240-244, Feb. 2005 (Identified in Item 3 below as dated Jan. 14, 2005).

ISO 15740; Photography—Electronic still picture imaging—Picture transfer protocol (PTP) for digital still photography devices; Second edition May 1, 2008, pp. i-vii (Identified in Item 3 below as First edition, Aug. 8, 2005).

The above references were cited in a Mar. 14, 2011 U.S. Notice of Allowance, that issued in U.S. Appl. No. 11/373,196, is enclosed.

* cited by examiner

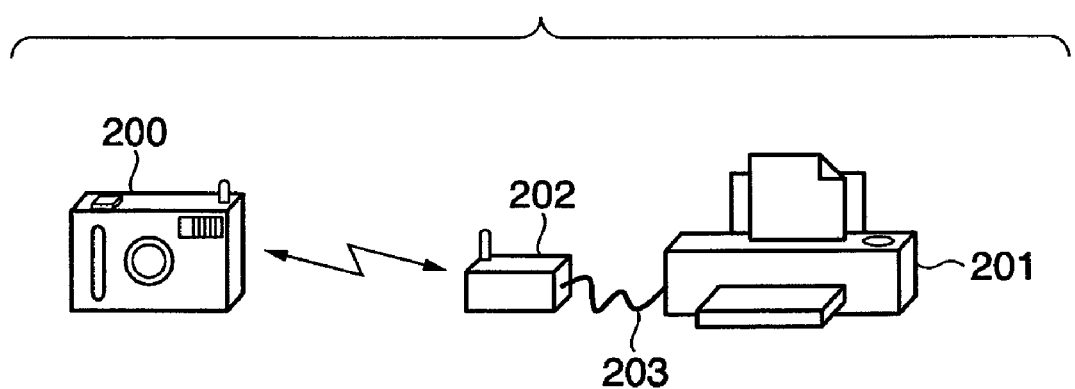
F I G. 2

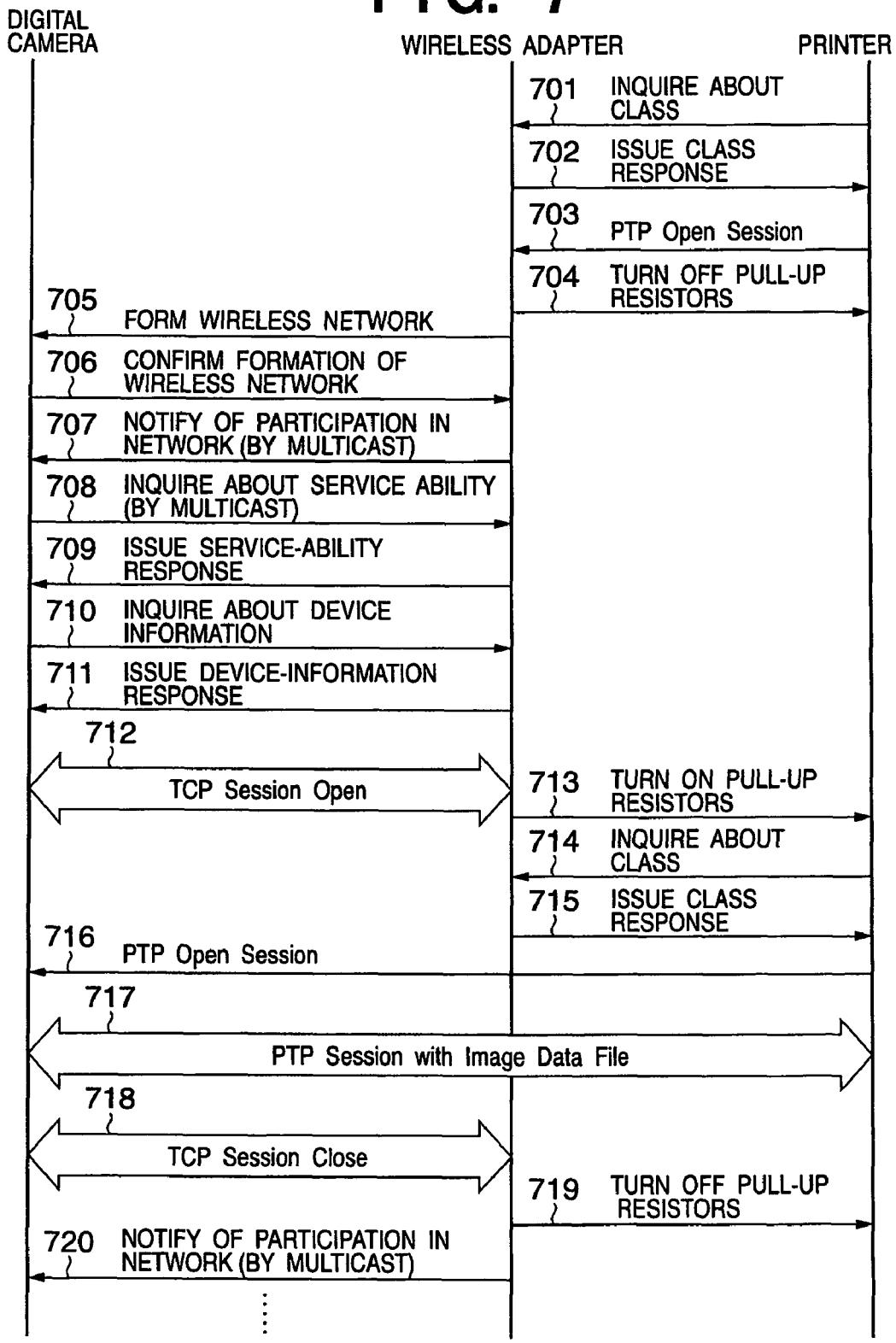

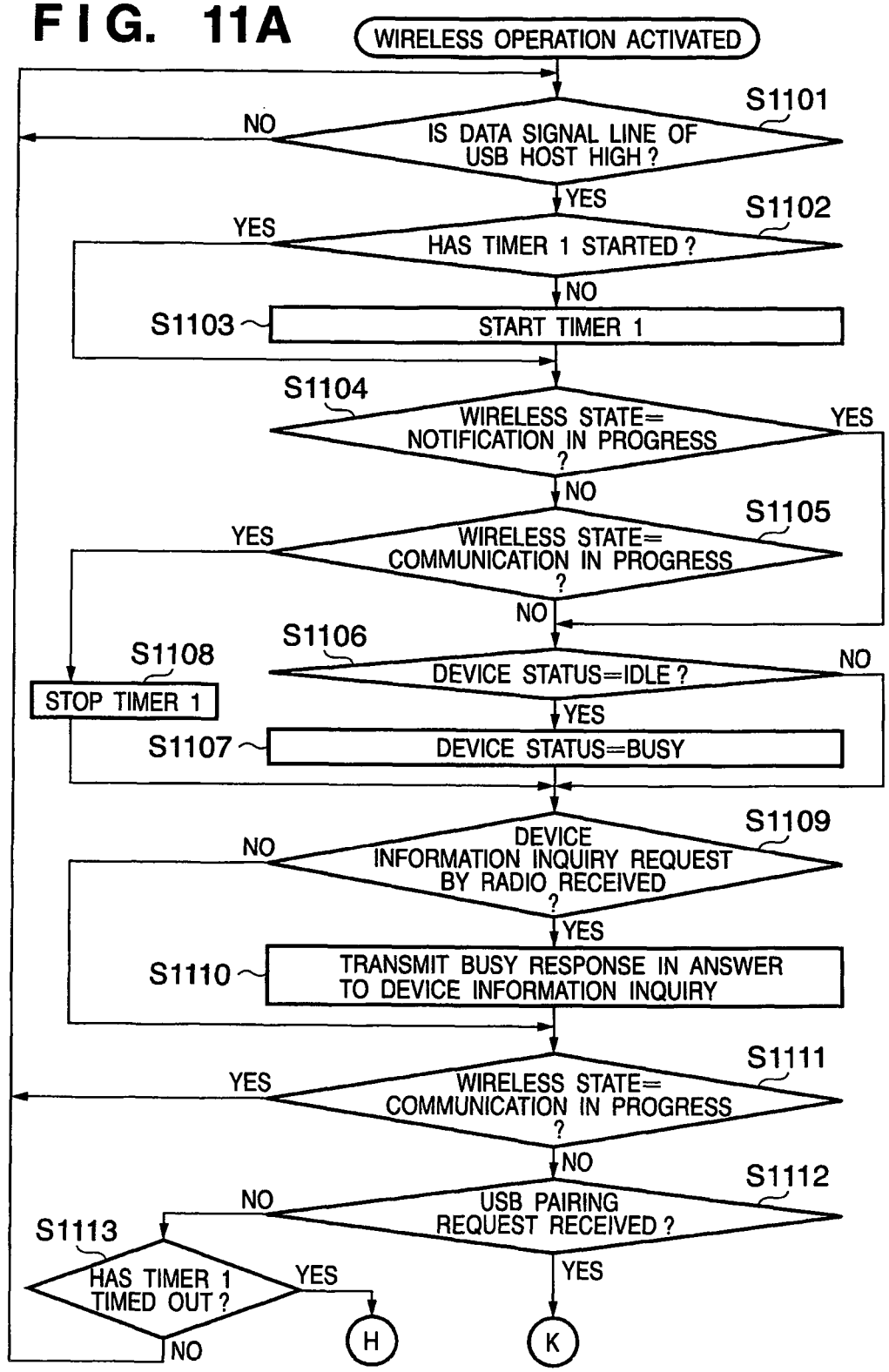

COMMUNICATION APPARATUS AND METHOD

FIELD OF THE INVENTION

This invention relates to a communication apparatus having a plurality of communication interfaces, and to a communication method in this apparatus.

BACKGROUND OF THE INVENTION

A method in which a digital camera and printer are connected directly by wire to perform printing has been proposed. Control information and print data are exchanged between the printer and the digital camera by an operating flow described in, e.g., Patent Document 1 (Patent Registration No. 03530847).

Further, a technique in which a signal is switched between networks of different physical layers is disclosed in, e.g., Patent Document 2 (Japanese Patent Application Laid-Open No. 10-257119).

In the description that follows, a printer in the present invention refers to one that is connected to a digital camera physically or logically and is capable of receiving data directly from the digital camera.

FIG. 1 is a diagram illustrating an example of a wired connection between a digital camera 100 and a printer 101. As shown in FIG. 1, the digital camera 100 and the printer 101 are connected directly by a cable 102 such as a USB cable. If image data is to be printed, it is required that the user plug and unplug the cable 102 before and after printing. A wireless system has been considered as a replacement for cables for the purpose of mitigating such a troublesome operation on the part of the user.

It is of course possible to simply adopt a wireless system for a wireless-capable digital camera and wireless-capable printer. However, there is also a need to allow a user who utilizes an existing wire-capable printer to enjoy wireless service by connecting a wireless communication device to the existing wire-capable printer.

However, operation of an existing wire-capable printer is such that when the printer is connected by cable, an operating sequence runs and connects the printer to the digital camera automatically, as set forth in Patent Document 1.

Consequently, when the printer has been connected to a wireless communication device, the connection of the printer to the digital camera will fail if the wireless connection between the wireless-capable digital camera and the wireless communication device has not yet been completed. The result is that the desired printing cannot be performed.

Further, the connection between the wireless communication device and the printer is by USB. In such case the USB device of the wireless communication device is connected to the USB host of the printer. However, there are instances where the USB device of the wireless communication device is connected to a personal computer and network and security information necessary for wireless communication are set in the wireless communication device from the personal computer.

That is, the wireless communication device operates differently depending upon whether the communicating party connected to its USB device is the printer or the personal computer. A problem with the wireless communication device as a consequence is that control suited to a plurality of operation modes must be performed.

SUMMARY OF THE INVENTION

An object of the present invention is to control communication with an device, which is connected to a wireless interface, in accordance with the device.

Another object of the present invention is to connect to and communicate with a communication device having a different communication interface without requiring that the user perform a complicated operation.

According to the present invention, the foregoing object is attained by providing a communication apparatus having a plurality of communication interfaces, comprising: a suppressing unit adapted to suppress communication with a first communication device, which has been connected to a first communication interface, in accordance with data from the first communication device; a unit adapted to establish communication with a second communication device by a second communication interface; a unit adapted to remove suppression of communication with the first communication device after communication with the second communication device has been established; and a unit adapted to relay data communication between the first and second communication devices via the first communication and second communication interfaces.

Further, according to the present invention, the foregoing object is attained by providing a communication apparatus having a plurality of communication interfaces, comprising: a unit adapted to suppress communication with a first communication device, which has been connected to a first communication interface, in accordance with data from the first communication device; a unit adapted to establish communication with a second communication device by a second communication interface; a unit adapted to remove suppression of communication with the first communication device after communication with the second communication device has been established; a unit adapted to identify state of communication with the second communication device by the second communication interface; and a unit adapted to notify communication devices on a network, which has been formed via the second communication interface, of the fact that service by the second communication interface has been halted, in a case where a third communication device has been connected by a third communication interface in a state in which the state of communication is not communication in progress, wherein in a case where communication with the first communication device is suppressed and the second communication interface is currently communicating with the second communication device, the third communication interface is not activated until communication with the second communication device is completed even if the fact that the third communication device has been connected to the third communication interface is recognized.

Further, according to the present invention, the foregoing object is attained by providing a communication apparatus having a plurality of communication interfaces, comprising: a suppressing unit adapted to suppressing communication with a first communication device, which has been connected to a first communication interface, in accordance with data from the first communication device; a unit adapted to establish communication with a second communication device by a second communication interface; a unit adapted to remove suppression of communication with the first communication device after communication with the second communication device has been established; a unit adapted to identify state of communication with the second communication device by the second communication interface; and a unit adapted to notify communication devices on a network, which has been formed via the second communication interface, of the fact that service by the second communication interface has transitioned to a busy state, in a case where a third communication device has been connected by a third communication interface in a state in which the state of communication is not communication in progress.

Further, according to the present invention, the foregoing object is attained by providing a communication method in a communication apparatus having a plurality of communication interfaces, comprising the steps of: suppressing communication with a first communication device, which has been connected to a first communication interface, in accordance with data from the first communication device; establishing communication with a second communication device by a second communication interface; removing suppression of communication with the first communication device after communication with the second communication device has been established; and performing data communication between the first and second communication devices via the first communication and second communication interfaces.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram illustrating an example of the form of a connection between a digital camera and a printer in a first embodiment of the present invention;

FIG. 7 is a diagram illustrating a sequence in a case where a digital camera and a printer perform printing wirelessly via a wireless adapter in the first embodiment;

FIGS. 11A and 11B are flowcharts illustrating suppression control processing by a wireless adapter according to a fourth embodiment of the present invention.

DETAILED DESCRIPTION OF THE PREFERRED EMBODIMENTS

Figure 1:
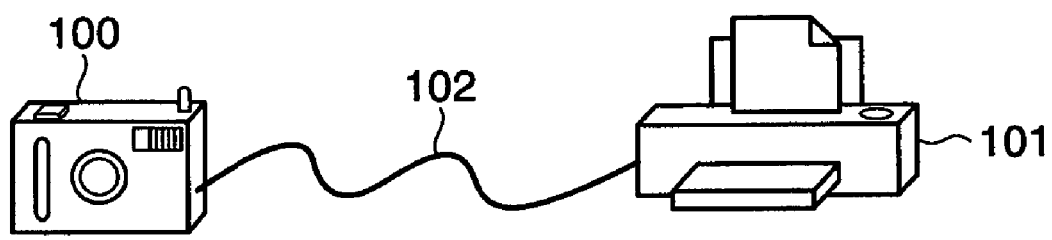
FIG. 1 is a diagram illustrating an example of a wired connection between a digital camera and a printer.

Preferred embodiments of the present invention will now be described in detail with reference to the drawings.

First Embodiment

FIG. 2 is a diagram illustrating an example of the form of a connection between a digital camera and a printer in a first embodiment of the present invention. A wireless-capable digital camera 200 in FIG. 2 has a wireless communication function such as a WLAN (Wireless Local Area Network) function or Bluetooth (registered trademark) function typified by IEEE 802.11b/11g/11a. An existing printer 201 supports a wired (USB cable) connection. A wireless communication device 202 according to the first embodiment is a wireless adapter having a plurality of communication interfaces such as a USB interface and wireless LAN interface. The wireless adapter 202 is connected to the printer 201 by a USB cable 203 and communicates with the digital camera 200 by a wireless LAN. The wireless adapter 202 transmits image data, which has been sent from the digital camera 200, to the printer 201 via the USB cable 203.

Figure 3:
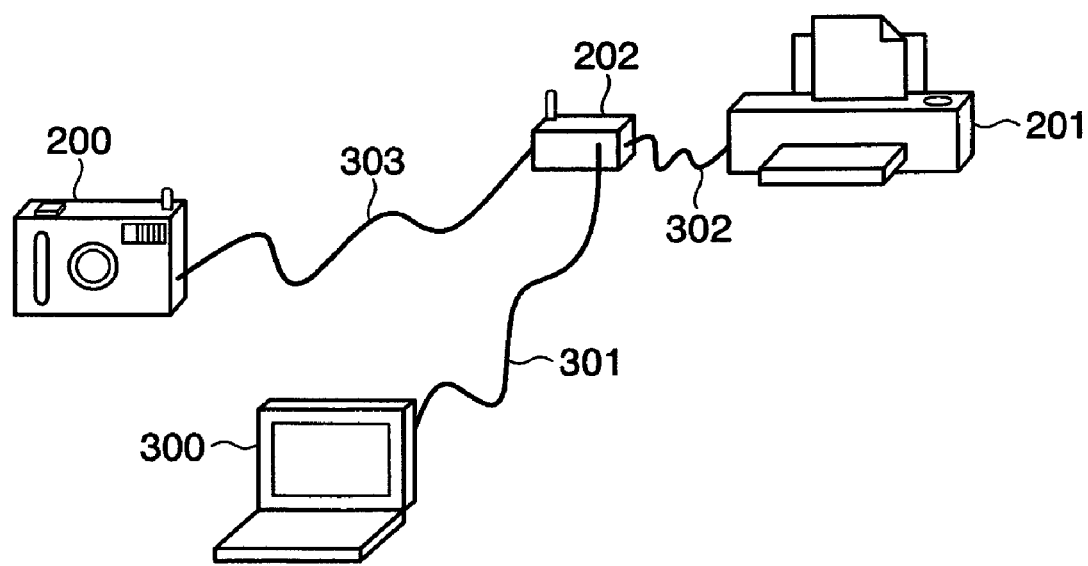
FIG. 3 is a diagram illustrating an example of the form of a connection to a personal computer.

It should be noted that in a case where the wireless adapter 202 has been connected to a personal computer 300 by a USB cable 301, as illustrated in FIG. 3, wireless information is set in the wireless adapter 202 from the personal computer 300. Further, in a case where the wireless adapter 202 has been connected to the printer 201 by a USB cable 302, the adapter is utilized as a wireless-communication relay for printing. Furthermore, in a case where the wireless adapter 202 has been connected to the digital camera 200 by a USB cable 303, the adapter is utilized in order to perform pairing between the digital camera 200 and a setting of wireless information.

The structure of the wireless adapter 202, which has the aforesaid plurality of operation modes and plurality of communication interfaces, will be described with reference to FIG. 4.

Figure 4:
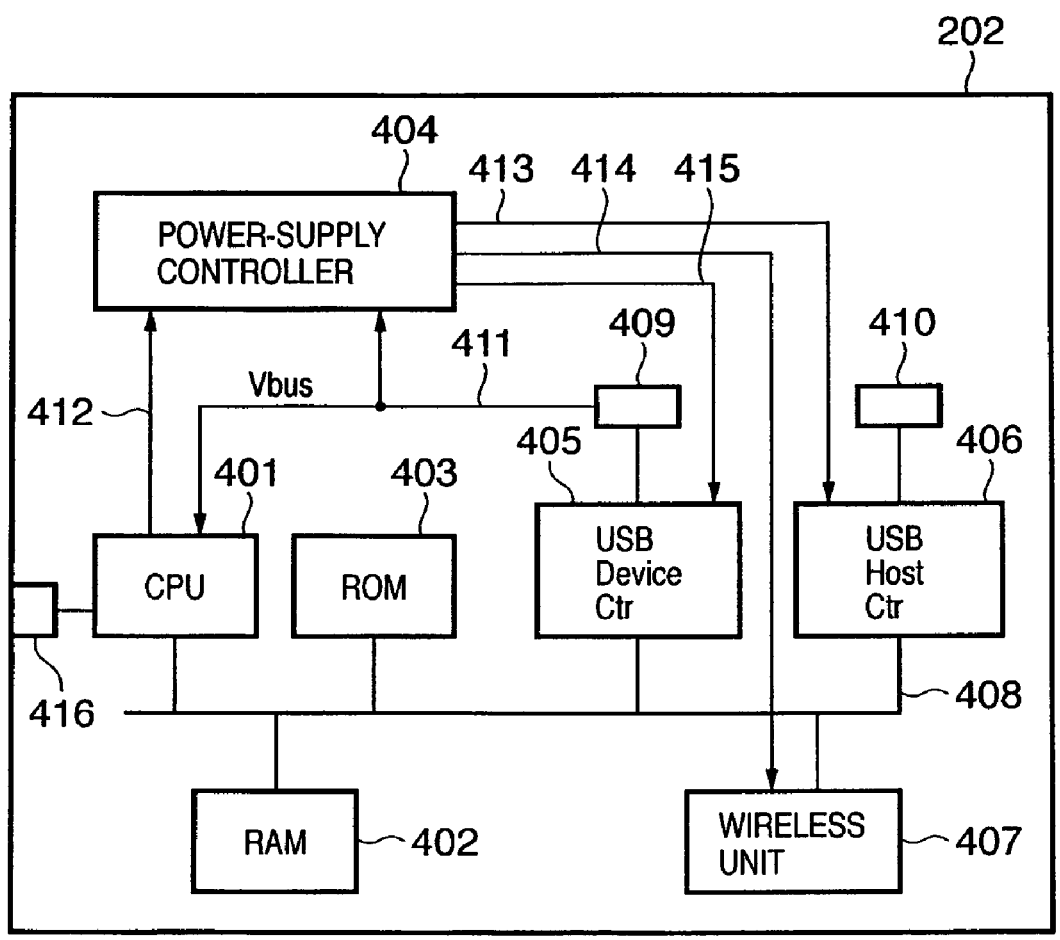
FIG. 4 is a block diagram illustrating an example of the structure of a wireless adapter according to the first embodiment.

FIG. 4 is a block diagram illustrating an example of the structure of the wireless adapter 202 according to the first embodiment. The wireless adapter 202 includes a CPU 401, a RAM 402, a ROM 403, a power-supply controller 404, a USB device controller (USB-Device-Ctr) 405, a USB controller (USB-Host-Ctr) 406, a wireless unit 407 and an internal bus 408.

The wireless adapter 202 further includes a USB device (USB-Device) connector 409 and a USB host (USB-Host) connector 410. A signal (Vbus) 411 detects whether or not a USB device has been connected. A control signal 412 is output by the CPU 401 to control the power-supply controller 404. A power supply 413 for the USB host controller 406, a power supply 414 for the wireless unit 407 and a power supply 415 for the USB device controller 405 are controlled by the power-supply controller 404.

A display device 416 comprises an LCD or LED for displaying the state of the connection of wireless adapter 202.

Figure 5:
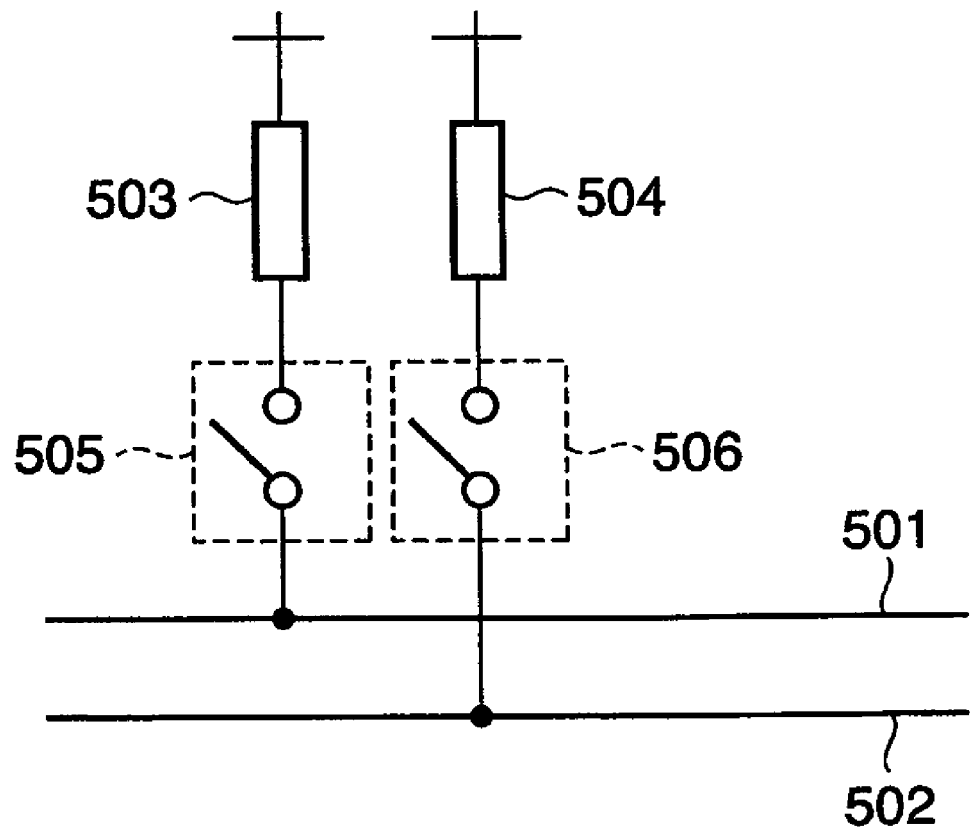
FIG. 5 is a diagram illustrating an example of the structure of a USB bus reset using a data signal line on the side of a USB device.

FIG. 5 is a diagram illustrating an example of the structure of a USB reset that uses data signal lines on the side of a USB device. Shown in FIG. 5 are USB data signal lines 501, 502, pull-up resistors 503, 504, and switches 505, 506 for controlling the connection between pull-up resistors and data signal lines. When data is sent and received to and from a USB device that has been connected to the USB device connector 409, the sending and receiving of the data is started by turning on the pull-up resistors 503, 504 by the switches 505, 506 in accordance with communication speed.

Described next with reference to FIGS. 6A and 6B will be connection control executed by the CPU 401 in a case where the personal computer 300 or printer 201 has been connected by a USB cable to the USB device connector 409 of the wireless adapter 202 as another device.

It should be noted that the CPU 401 has programmable timers and performs timekeeping by timers 1 and 2, described later. With the usual USB communication, the adapter sends back, as a class response, the response of the class which the adapter itself supports, and waits for data from the connected device. However, in a case where a "false" class response has been sent back, data may no longer be transmitted if the connected device (here the printer) recognizes that it is not connected to the desired device (here the digital camera).

In such case the timer that waits for the receive data from the connected device is timer 1. By proceeding to the next processing step upon waiting for the timer 1 to time out, communication by the printer can be rendered effective again upon previously establishing the connection of the wireless LAN, and the printer can perform wireless communication with the digital camera via the wireless adapter.

Further, the timer employed when the connection between the digital camera and wireless adapter is checked is timer 2. In a case where the activated timer 2 times out, i.e., in a case where a digital camera does not exist, or in a case where a connection has not been made, the wireless adapter 202 transitions to the CPU sleep mode, whereby operation can be performed with little consumption of power.

Figure 6A:
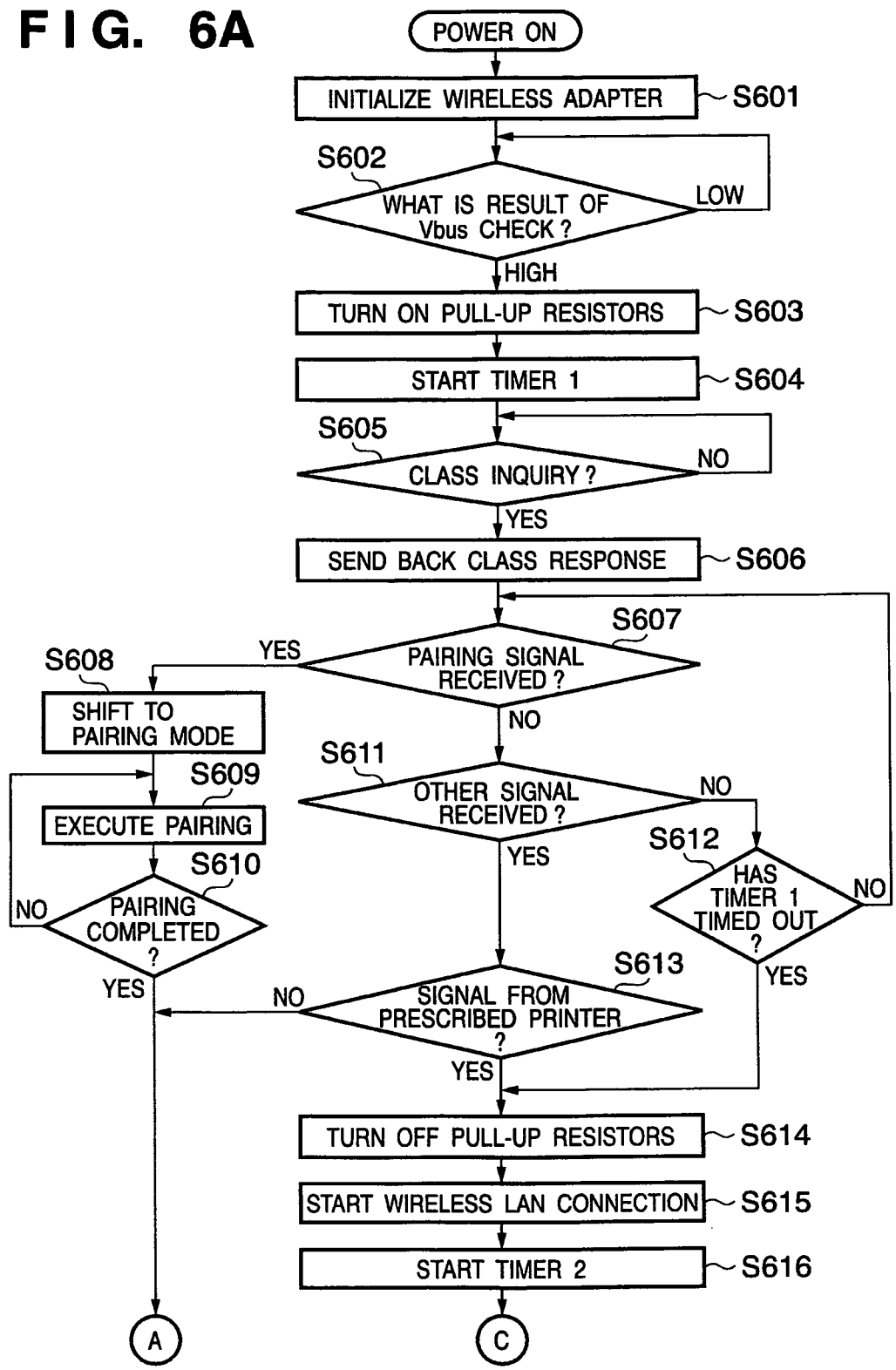
FIGS. 6A and 6B are flowcharts illustrating connection control processing in the wireless adapter according to the first embodiment.
Figure 6B:
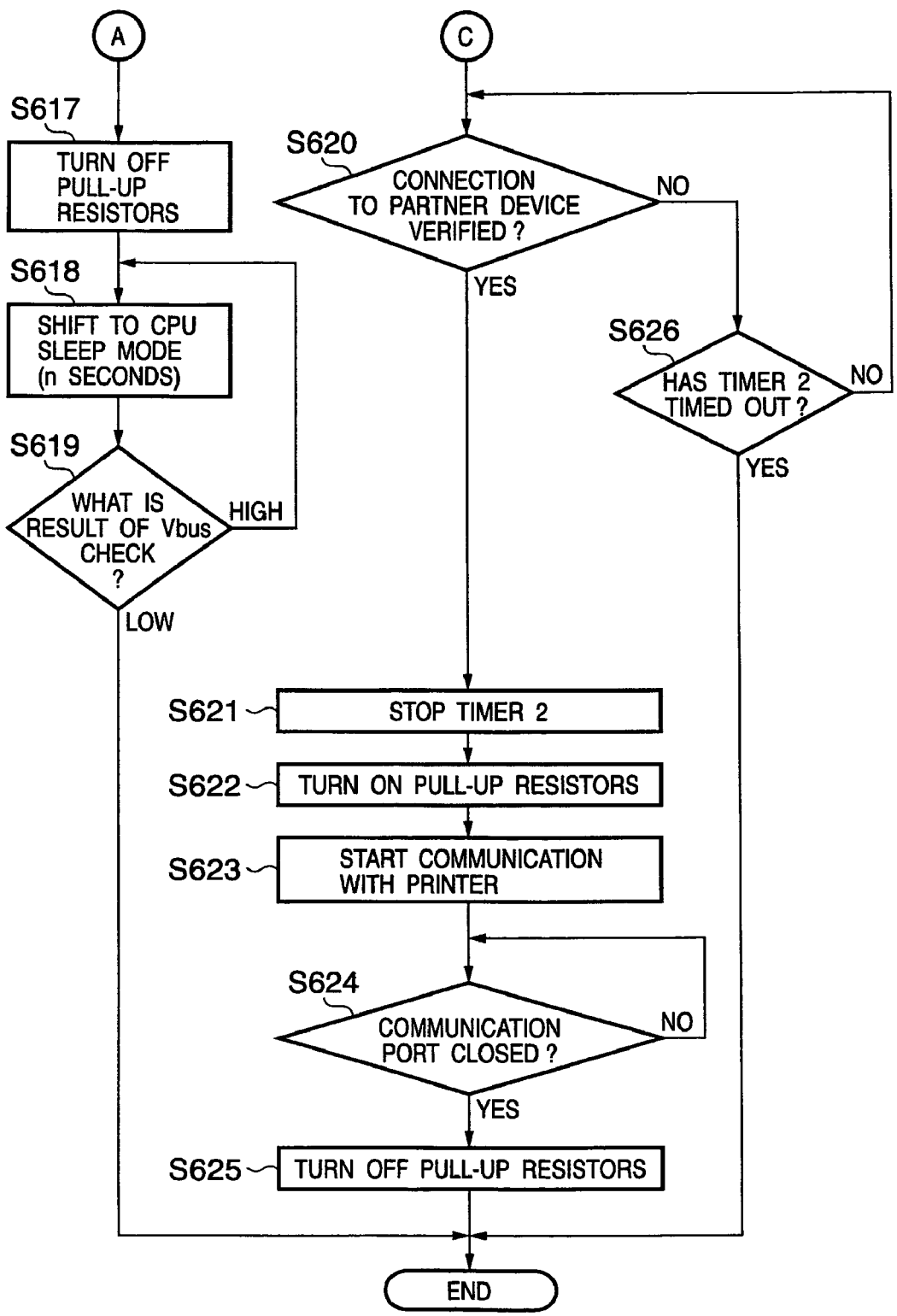

FIGS. 6A and 6B are flowcharts illustrating connection control processing in the wireless adapter in the first embodiment. First, when power is introduced to the wireless adapter 202, control proceeds to step S601 to initialize the wireless adapter 202. Next, at step S602, it is checked based upon the signal (Vbus) 411 whether another device has been connected to the USB device connector 409. If the signal 411 attains the high level, the fact that another device has been connected is recognized and control proceeds to step S603. Here the pull-up resistors 503, 504 are turned on by the switches 505, 506 in accordance with the transfer speed of data indicating the data transfer is possible, thereby enabling data transfer with the connected device. This is followed by step S604, at which timer 1, which measures the time it takes to identify the connected party, is activated.

Next, at step S605, the adapter waits for receipt of an inquiry regarding USB class from the device that has been connected to the USB device connector 409. When the inquiry is received, control proceeds to step S606, whereby the class response is sent back. Processing from this point onward is processing for checking data sent from the connected device and checking the type of device (i.e., in the first embodiment, determining whether the device is a printer or a personal computer) and connection method.

First, at step S607, if the receive data is, e.g., a pairing signal indicating a wireless information setting, then the fact that a connection to the personal computer 300 of FIG. 3 has been established by the USB cable 301 is identified, control proceeds to step S608 and a transition is made to a pairing mode. The wireless adapter 202 executes pairing with the personal computer 300 at step S609. With pairing, wireless information is transferred from the personal computer 300 to the wireless adapter 202. From this point onward, the wireless adapter 202 forms a wireless network in accordance with the wireless information that has been transferred.

Next, it is determined at step S610 whether pairing has been completed. If pairing has been completed, control proceeds to step S617, where the pull-up resistors 503, 504 are turned off by the switches 505, 506 in order to disable the sending and receiving of data. Then, at step S618, a transition is made to the CPU sleep mode for a prescribed time (n seconds). At step S619, the signal 411 is checked in order to determine whether the USB cable 301 connecting the personal computer 300 and wireless adapter 202 has been disconnected. If the USB cable 301 is disconnected from the personal computer 300, then this processing is exited.

If it is found at step S607 that the data from the device that has been connected to the USB device connector 409 is not a pairing signal, then control proceeds to step S611. Here it is determined whether another signal has been received. If no signal whatsoever has been received, then control proceeds to step S612. Control returns to step S607 and standby for receipt of a signal is continued until timer 1 times out at step S612. If neither the pairing signal nor another signal is received, control thenceforth proceeds to step S614, the details of which will be described later, at time-out of timer 1.

Further, if it is found at step S611 that another signal has been received, then control proceeds to step S613. Here it is determined whether the signal is one from the prescribed printer, i.e., whether the connected device is printer 201. If the signal is not from the printer 201, then control proceeds to step S617 and the above-described processing is executed.

On the other hand, if a signal from the printer 201 is received, then control proceeds to step S614. Here the pull-up resistors 503, 504 are turned off by the switches 505, 506 in order to disable the sending and receiving of data to and from the printer 201. The connection to the wireless LAN by the wireless unit 407 is started at step S615, and the timer 2 for checking the connection to the digital camera 200 via the wireless communication device is activated.

Next, at step S620, the connection to the digital camera 200 is checked. If the connection can be verified, control proceeds to step S621, where the connection verification timer 2 is halted. This is followed by step S622, at which the pull-up resistors 503, 504 are turned on by the switches 505, 506 in order to enable the sending and receiving of data to and from the printer 301. At step S623, operation in a case where the printer 201 has been connected to the digital camera 200 is started automatically and therefore communication via the wireless adapter 202 is started between the digital camera 200 and printer 201.

Next, at step S624, data is received and it is determined whether a communication port at which communication between the digital camera 200 and wireless adapter 202 is being performed has been closed. If the communication port has been closed, control proceeds to step S625. Here the pull-up resistors 503, 504 are turned off by the switches 505, 506 in order to disable data communication. Processing is then exited.

If connection to the digital camera 200 cannot be verified at step S620, control proceeds to step S626. Here it is determined whether timer 2 has timed out. The operation to verify the connection is continued until timer 2 times out. If timer 2 times out without the connection being verified, control proceeds to step S617 and the above-described processing is executed.

Described next will be a sequence in a case where the wireless-capable digital camera 200 transfers an image data file to the existing wire-capable printer 201 by wireless communication via the wireless adapter 202 to perform printing by the printer 201.

FIG. 7 is a diagram illustrating a sequence in a case where a digital camera 200 and the printer 201 perform printing wirelessly via the wireless adapter 202 according to the first embodiment. First, when the wireless adapter 202 is connected to the printer 201 by the USB cable 203, as illustrated in FIG. 2, a class inquiry (701) is sent from the printer 201 to the wireless adapter 202. If the wireless adapter 202 sends back a class response (702) to the printer 201, a PTP Open Session (703), which represents the start of a session with the digital camera 200, is sent from the printer 201. Since a wireless connection with the digital camera 200 still has not been established, the wireless adapter 202 turns off (704) the pull-up resistors 503, 504 in order to temporarily disable communication with the printer 201.

Next, the wireless adapter 202 starts the wireless LAN connection and forms an adhoc network (705). If confirmation of formation of the network is received from the digital camera 200 (706), then the wireless adapter 202 transmits by multicast the fact that it has participated in the network to the devices that exist in the same network (707). In order to search for a device that provides a print service, the digital camera 200 issues a service-ability inquiry by multicast (708). As a result, since the wireless adapter 202 is present in the same network and can provide a print service to the digital camera 200 by connection to the printer 201, the wireless adapter 202 sends the digital camera 200 a response concerning its service ability (709).

Next, the digital camera 200 sends the wireless adapter 202 a device-information inquiry for acquiring detailed device information (710). As a result, the wireless adapter 202 sends a device-information response to the digital camera 200 (711). The digital camera 200 subsequently establishes a TCP session for performing data communication with the printer 201 (712). Upon confirming establishment of this session, the wireless adapter 202 turns on the above-mentioned pull-up resistors in order to enable data communication with the printer 201 (713).

As a result, the wireless adapter 202 receives the class inquiry (714) from the printer 201 and transmits a class response (715). Now a wireless link is established between the digital camera 200 and the wireless adapter 202. Since wireless communication can be carried out, the printer establishes a PTP session, which is a host protocol for transferring an image data file, between itself and the digital camera 200 (716). The image data file is subsequently transferred from the digital camera 200 to the printer 201 via the wireless adapter 202 in the PTP session (717). When the digital camera 200 finishes sending the image data file, the TCP session for data communication is ended (718).

Next, the wireless adapter 202 identifies that wireless communication with the digital camera 200 has ended, turns off the above-mentioned pull-up resistors with respect to the printer 201 and reports that the sending and receiving of data has been disabled (719). The wireless adapter 202 then continues to send the devices that exist in the same network a signal by multicast indicating that it is still participating in the network (720).

In accordance with the first embodiment, the wireless adapter 202 having a plurality of operation modes and a plurality of interfaces is such that when the wireless-capable digital camera 200 communicates with the existing wire-capable printer 201, control is exercised so as to actuate the printer 201 after wireless communication with the digital camera 200 becomes possible. This makes it possible to execute wireless communication without requiring that the user perform a complicated operation.

Further, when power is introduced to the wireless adapter 202, wireless operation is not performed immediately but controlled in accordance with the operation mode, thereby reducing power consumption.

Second Embodiment

A second embodiment according to the present invention will now be described in detail with reference to the drawings. In the first embodiment, an example in which the personal computer 300 or printer 201 is connected to the USB device connector 409 of the wireless adapter 202 has been described. In the second embodiment, however, suppression control by the wireless adapter 202 will be described taking as an example a case where a digital camera has been connected to the USB host connector 410 by a USB cable.

The structure of the wireless adapter according to the second embodiment is similar to that of the first embodiment described above with reference to FIG. 4 and need not be described again.

Figure 8:
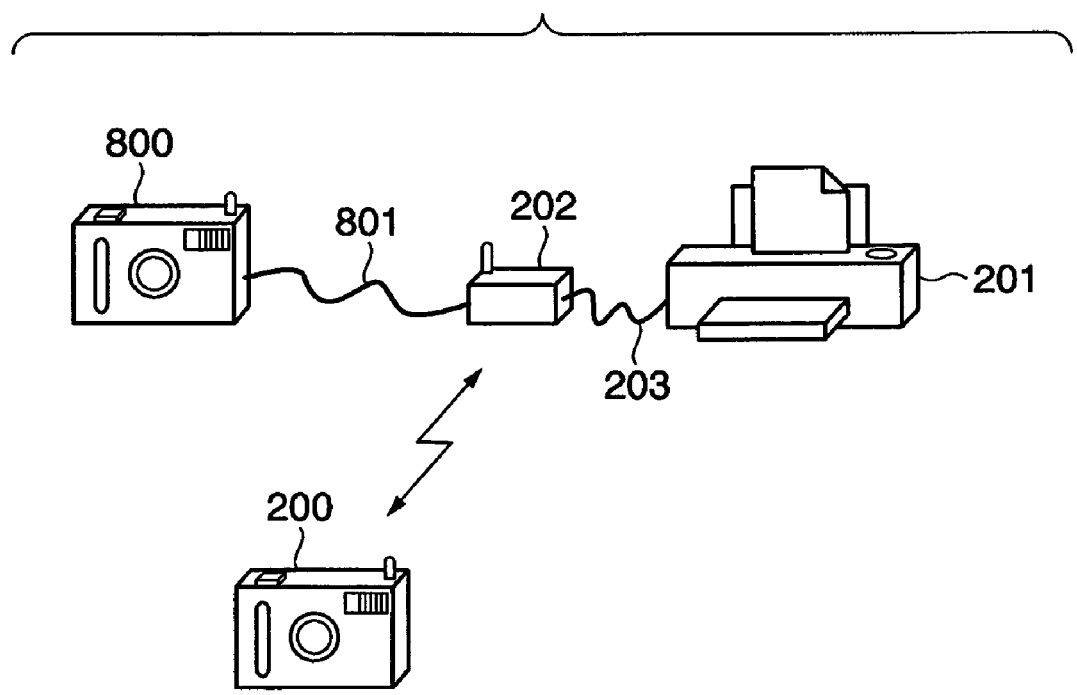
FIG. 8 is a diagram illustrating an example of the form of a connection between a digital camera and a printer in a second embodiment of the present invention.

FIG. 8 is a diagram illustrating an example of the form of a connection between a digital camera and a printer in the second embodiment. According to the second embodiment, as illustrated in FIG. 8, a digital camera 800 is connected to the USB host connector 410 of the wireless adapter 202 by a USB cable 801. This is in addition to the connections according to the first embodiment shown in FIG. 2. It should be noted that the digital camera 800 is connected to the wireless adapter 202 in order to perform pairing of the wireless information settings.

Figure 9A:
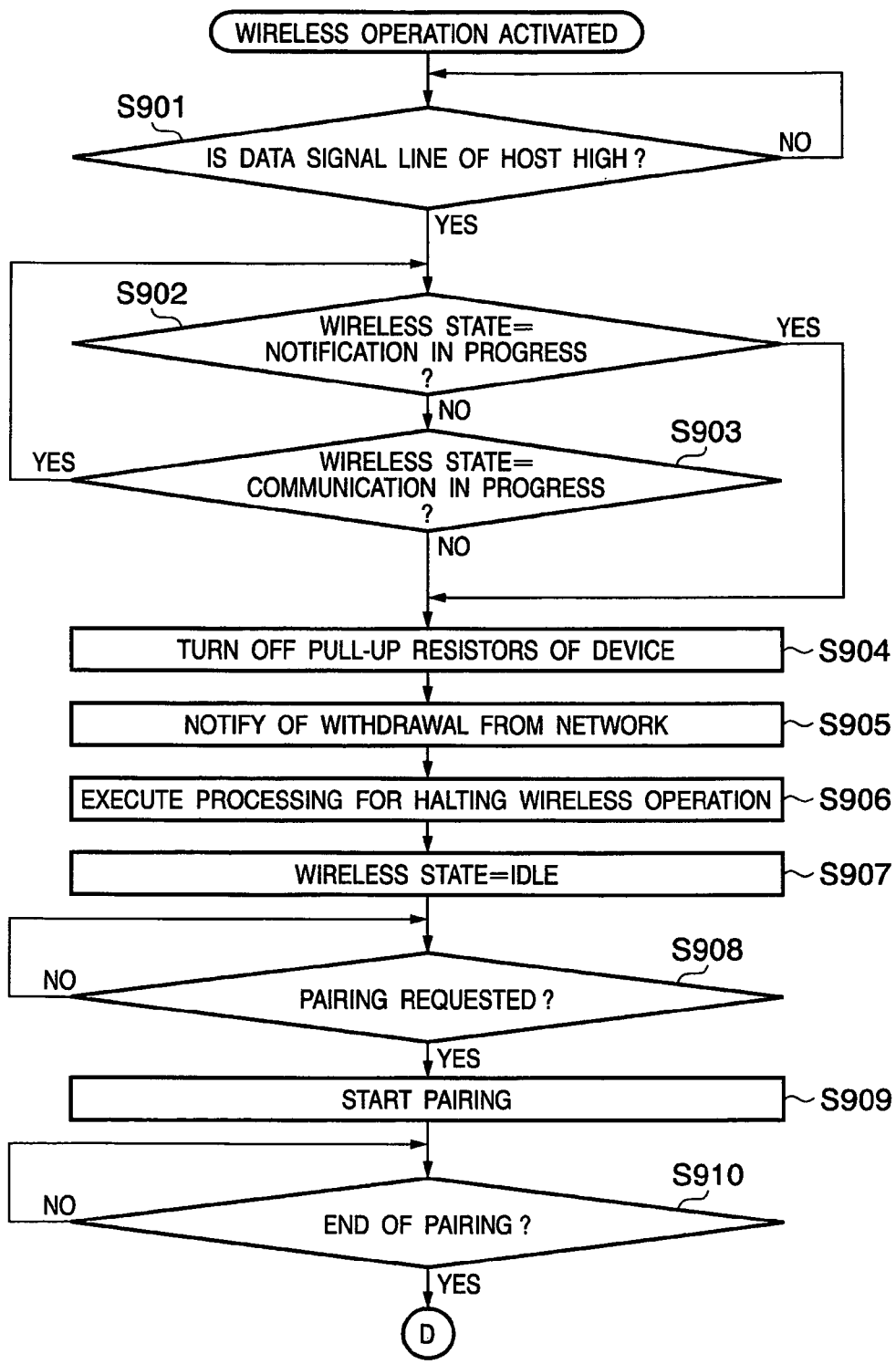
FIGS. 9A and 9B are flowcharts illustrating suppression control processing by a wireless adapter in the second embodiment.
Figure 9B:
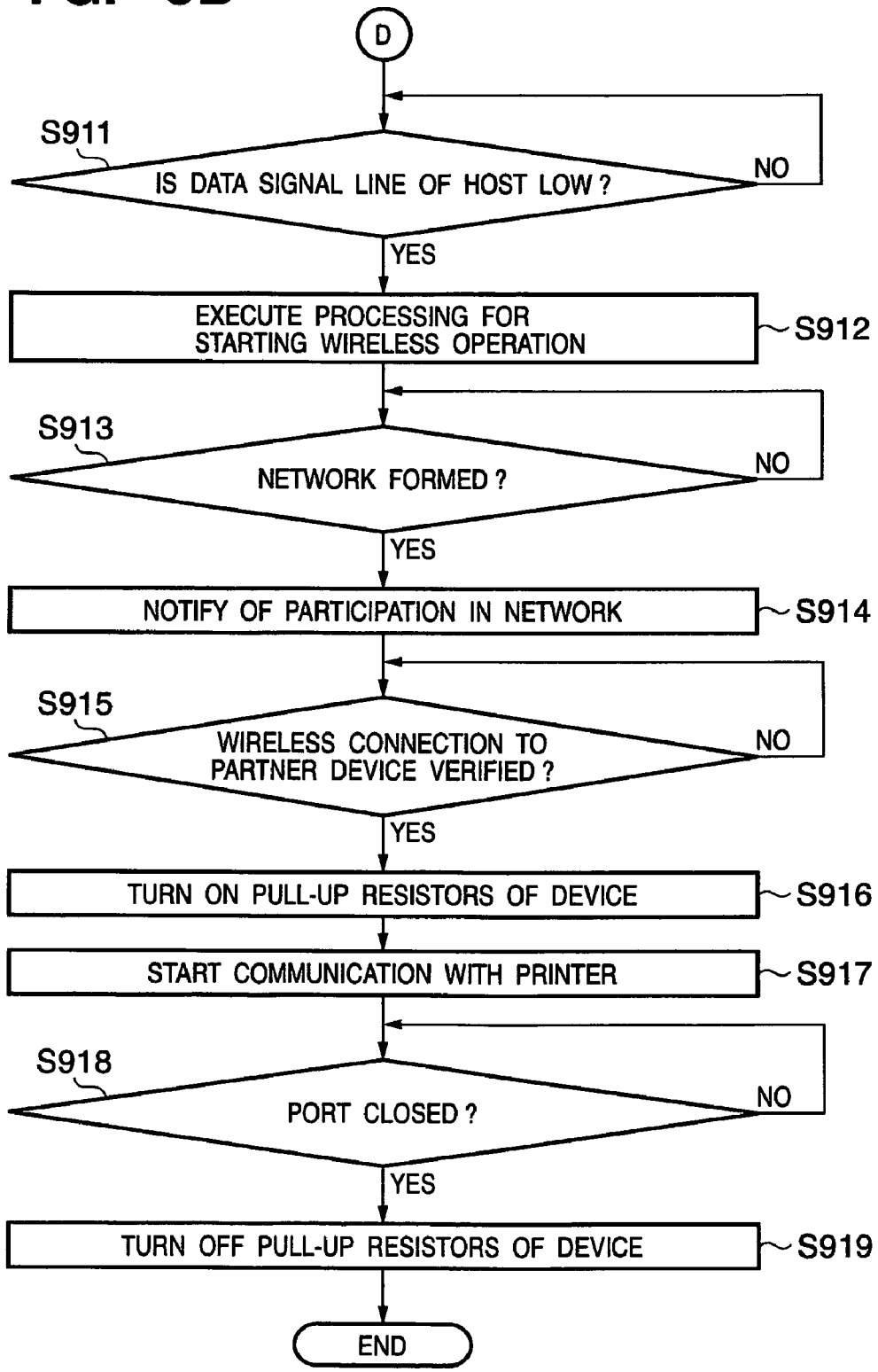

Next, reference will be had to FIGS. 9A and 9B to describe suppression control processing executed by the CPU 401 in a case where the digital camera 800 has been connected to the USB host connector 410 by the USB cable 801 when the wireless adapter 202 is participating in a network.

FIGS. 9A and 9B are flowcharts illustrating suppression control processing by a wireless adapter according to the second embodiment. First, operation starts with the wireless LAN in the activated state. When it is sensed at step S901 that the data signal line of the USB host connector 410 has attained the high level, it is judged that a device (e.g., the digital camera 800) has been connected to the USB host connector 410. It is then determined at step S902 whether the wireless state is notification-in-progress of the existence of the adapter by multicast. Control proceeds to step S904 if such notification is in progress and to step S903 if it is not.

It is determined at step S903 whether the wireless adapter 202 is currently communicating wirelessly with the digital camera 200. If the answer is "YES", control returns to step S902, where the adapter waits for communication to end. If communication is continuing or communication ends, the pull-up resistors of the USB device connector 409 to which the printer 201 has been connected are turned off at step S904 to disable data communication. Next, at step S905, notification of withdrawal from the wireless network is reported by multicast to the devices that exist on the same network.

Next, at step S906, processing for halting the wireless operation is executed and the wireless state is then set to IDLE at step S907. Then, at step S908, if there is a pairing request for wireless information settings from the digital camera 800 connected to the USB host connector 410 by the USB cable, control proceeds to step S909 and pairing is started. If end of pairing is thenceforth verified, control proceeds from step S910 to step S911. If the USB cable 801 is disconnected from the digital camera 800 and the data signal line falls to the low level, it is determined that the connection has ended, control proceeds to step S912 and processing for starting wireless communication is executed.

If a network is formed at step S913, control proceeds to step S914 and notification of network participation by the adapter is transmitted by multicast. This is followed by step S915. If connection to the digital camera 200 is verified at this step, then the pull-up resistors of the USB device are turned on at step S916 and communication with the printer 201 is started at step S917. If completion of communication is sensed at step S918, then the pull-up resistors are turned off at step S919 and processing ends with communication to the printer 201 being disabled.

In accordance with the second embodiment, suppression of communication between the printer 201 and wireless adapter 202 is controlled in accordance with the state of wireless communication. As a result, even if the wireless adapter 202 receives a pairing request from the other digital camera 800 while it is communicating with the digital camera 200, control can be exercised without hindering operation during wireless communication.

Third Embodiment

Next, a third embodiment according to the present invention will be described in detail with reference to the drawings. Although the third embodiment is approximately equivalent to the first embodiment, if the wireless adapter 202 has been connected to the printer 201, then the adapter exercises suppression control in a case where a request signal from the printer 201 is held internally until the wireless LAN is connected.

The structure of the wireless adapter according to the third embodiment is similar to that of the first embodiment described above with reference to FIG. 4 and need not be described again.

Figure 10A:
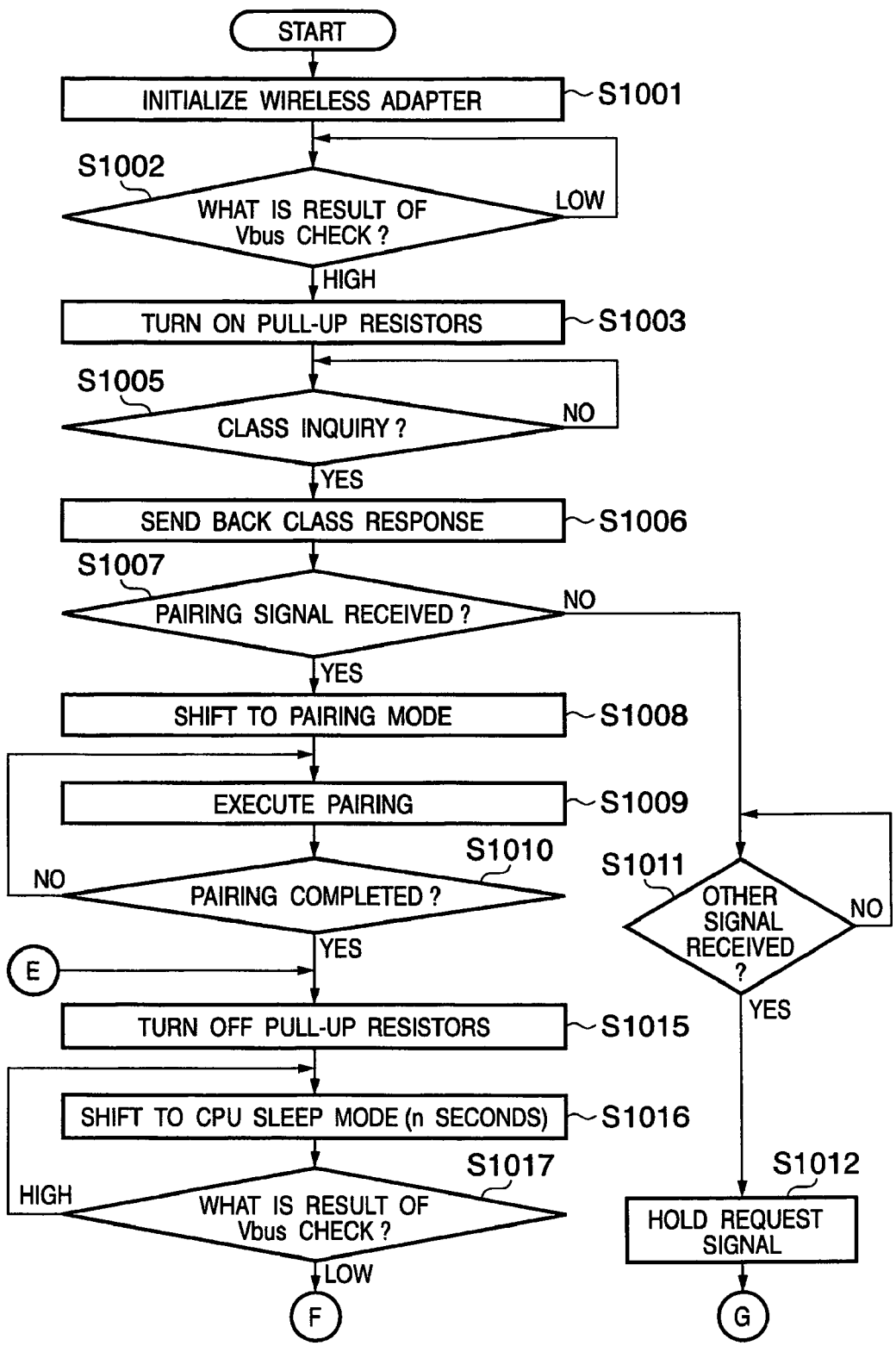
FIGS. 10A and 10B are flowcharts illustrating connection control processing in the wireless adapter according to a third embodiment of the present invention.
Figure 10B:
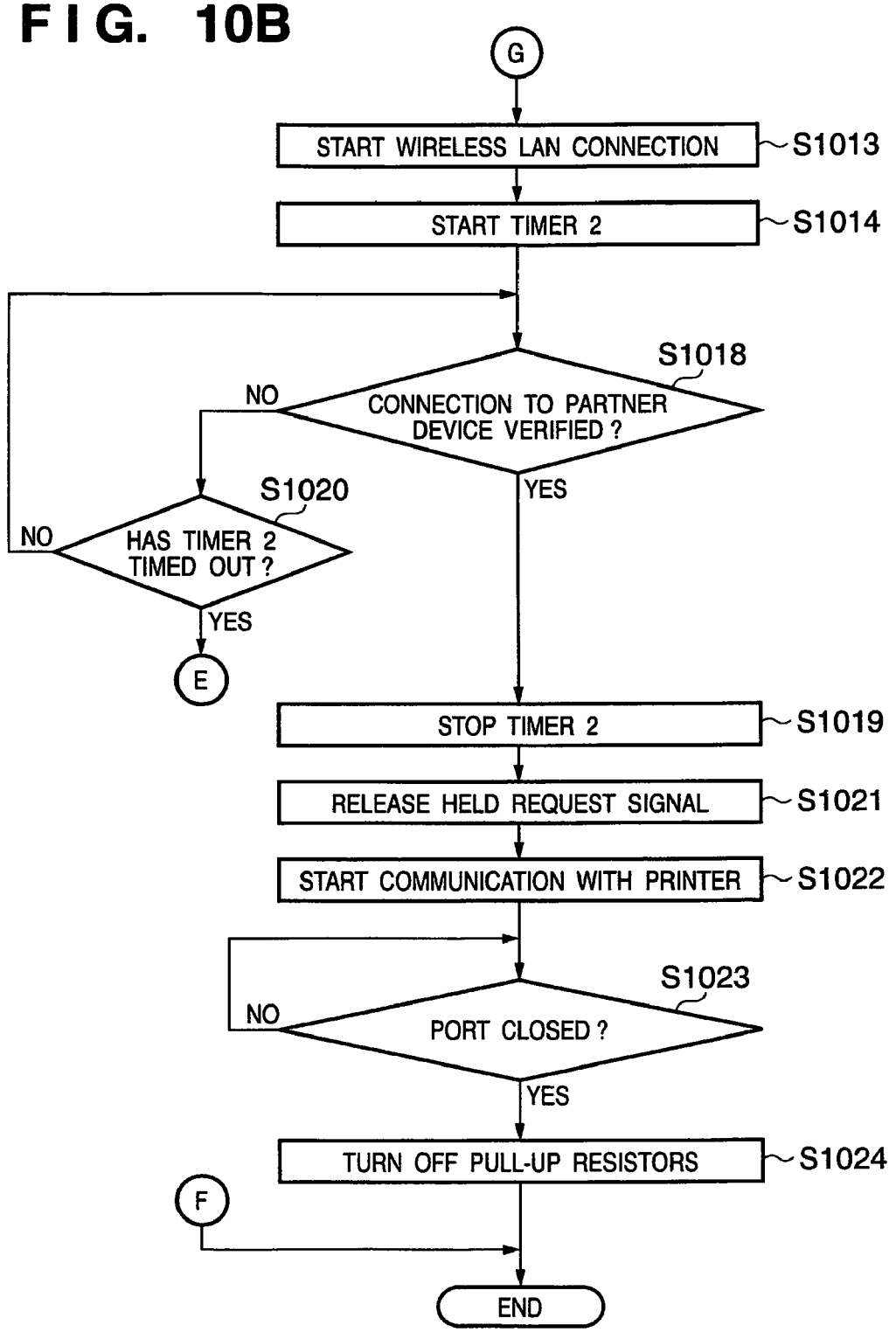

Next, reference will be had to FIGS. 10A and 10B to describe connection control executed by the CPU 401 in a case where the personal computer 300 or printer 201 has been connected as another device to the USB device connector 409 of the wireless adapter 202 by a USB cable with the form of the connection shown in FIG. 2.

FIGS. 10A and 10B are flowcharts illustrating connection control processing in the wireless adapter according to a third embodiment of the present invention. First, when power is introduced to the wireless adapter 202, control proceeds to step S1001 to initialize the wireless adapter 202. Next, at step S1002, it is checked based upon the signal (Vbus) 411 whether another device has been connected to the USB device connector 409. If the signal 411 attains the high level, the fact that another device has been connected is recognized and control proceeds to step S1003. Here the pull-up resistors 503, 504 are turned on by the switches 505, 506 in accordance with the transfer speed of data indicating that data transfer is possible.

Next, at step S1005, the adapter waits for receipt of a query regarding USB class from the device that has been connected to the USB device connector 409. When the query is received, control proceeds to step S1006, whereby the class response is sent back. Processing from this point onward is processing for checking data sent from the connected device and checking the type of device (i.e., in the third embodiment, determining whether the device is a printer or a personal computer) and connection method.

First, at step S1007, if the receive data is, e.g., a pairing signal indicating a wireless information setting, the fact that a connection to the personal computer 300 of FIG. 3 has been established by the USB cable 301 is identified, control proceeds to step S608 and a transition is made to a pairing mode. The wireless adapter 202 executes pairing with the personal computer 300 at step S1009. With pairing, wireless information is transferred from the personal computer 300 to the wireless adapter 202. From this point onward, the wireless adapter 202 forms a wireless network in accordance with the wireless information that has been transferred.

Next, it is determined at step S1010 whether pairing has been completed. If pairing has been completed, control proceeds to step S1015, where the pull-up resistors 503, 504 are turned off by the switches 505, 506 in order to disable the sending and receiving of data. Then, at step S1016, a transition is made to the CPU sleep mode for a prescribed time (n seconds). At step S1017, the signal 411 is checked in order to determine whether the USB cable 301 connecting the personal computer 300 and wireless adapter 202 is disconnected. If the USB cable 301 is disconnected from the personal computer 300, then this processing is exited.

If it is found at step S1007 that the data from the device that has been connected to the USB device connector 409 is not a pairing signal, then control proceeds to step S1011. Here the adapter waits for receipt of another signal. If another signal is received, control proceeds to step S1012, where the signal requested from the printer 201 is held internally. Next, at step S1013, connection of the wireless LAN is started. Timer 2 for verifying the wireless connection to the digital camera 200 is activated at step S1014.

Next, at step S1018, the connection to the digital camera 200 is checked. If the connection can be verified, control proceeds to step S1019, where the connection verification timer 2 is halted. Next, at step S1021, the retention of the request signal that is being held is terminated and the signal is transmitted to the printer 201. Communication between the digital camera 200 and printer 201 via the wireless adapter 202 is started at step S1022.

Next, at step S1023, data is received and it is determined whether a communication port at which communication between the digital camera 200 and wireless adapter 202 is being performed has been closed. If the communication port has been closed, control proceeds to step S1024. Here the pull-up resistors 503, 504 are turned off by the switches 505, 506 in order to disable data communication. Processing is then exited.

If connection to the digital camera 200 cannot be verified at step S1018, control proceeds to step S1020. Here it is determined whether timer 2 has timed out. The operation to verify the connection is continued until timer 2 times out. If timer 2 times out without the connection being verified, control proceeds to step S1015 and the above-described processing is executed.

In accordance with the third embodiment, it is unnecessary to exercise control for resetting the USB in mid-course and causing the printer side to execute processing again starting from communication initialization processing in response to such reset. As a result, similar effects can be obtained even with an arrangement in which a connection is made to the wireless adapter without particular dependence upon a USB. For example, the connection can be made in compliance with IEEE 1394.

Fourth Embodiment

A fourth embodiment according to the present invention will now be described in detail with reference to the drawings. In the fourth embodiment, suppression control by the wireless adapter will be described taking as an example a case where a digital camera has been connected to the USB host connector 410 by a USB cable in a manner similar to that of the second embodiment.

The structure of the wireless adapter according to the fourth embodiment is similar to that of the second embodiment described above with reference to FIG. 4 and need not be described again.

Further, the fourth embodiment also assumes use of the form of connection shown in FIG. 8 of the second embodiment as the form of connection between the digital camera and printer.

Figure 11B:
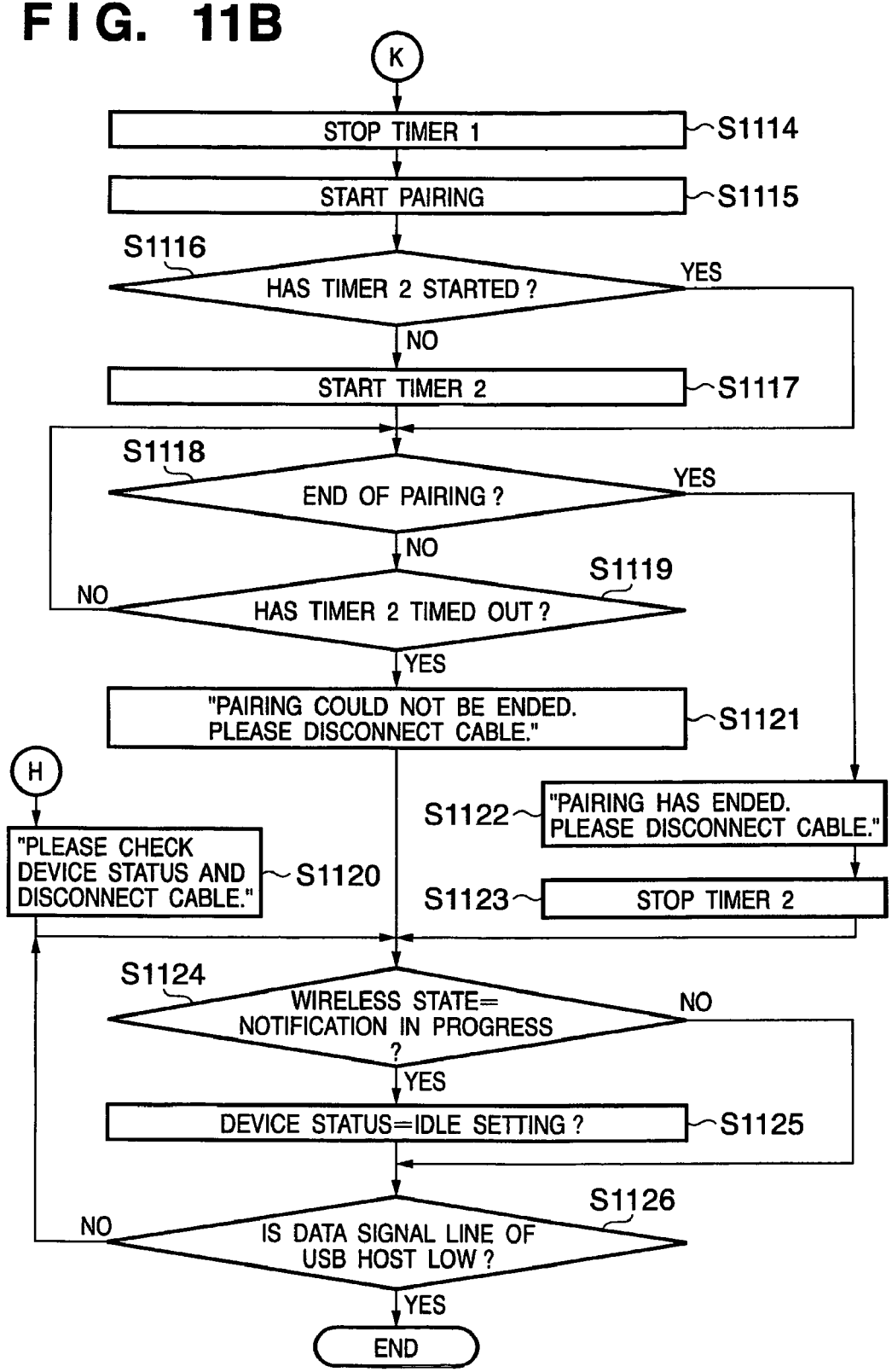

Next, reference will be had to FIGS. 11A and 11B to describe suppression control processing executed by the CPU 401 in a case where the digital camera 800 has been connected to the USB host connector 410 by the USB cable 801 when the wireless adapter 202 is participating in a network.

FIGS. 11A and 11B are flowcharts illustrating suppression control processing by a wireless adapter according to the fourth embodiment. First, operation starts with the wireless LAN in the activated state. When it is sensed at step S1101 that the data signal line of the USB host connector 410 has attained the high level, it is judged that a device (e.g., the digital camera 800) has been connected to the USB host connector 410. Whether timer 1 that waits for receipt of a pairing request has started is checked at step S1102. If timer 1 has not started, control proceeds to step S1103 and timer is started.

It is then determined at step S1104 whether the wireless state is notification-in-progress of the existence of the adapter by multicast. Control proceeds to step S1106 if such notification is in progress and to step S1105 if it is not. It is determined at step S1105 whether the wireless state is that communication with the digital camera 200 is in progress. If the answer is "NO", control returns to step S1106, where it is determined whether the status of the device is IDLE. If the determination is "YES", control proceeds to step S1107 and the status of the device is set to BUSY.

If it is determined at step S1105 that the wireless state indicates that communication with the digital camera 200 is in progress, control proceeds to step S1108, where timer 1 is halted, and then to step S1109.

If an inquiry request for device information is thenceforth received from the digital camera 200 at step S1109, control proceeds to step S1110, where the status of the device is set to BUSY and a response to the device-information inquiry is transmitted. It is determined at step S1111 whether the wireless state is communication in progress. If communication is in progress, control returns to step S1101.

Next, it is determined at step S1112 whether a pairing request by the USB has been received from the digital camera 800. If the request has been received, control proceeds to step S1114 and timer 1 is halted. Pairing is started at step S1115 and it is determined at step S1116 whether timer 2 has started. If timer 2 has started, then control proceeds to step S1118 as is. If timer 2 has not started, then control proceeds to step S1117, timer 2 is started and control proceeds to step S1118.

End of pairing is awaited at step S1118. If pairing has not ended, control proceeds to step S1119 and it is determined whether timer 2 waiting for end of pairing has timed out. If timer 2 has not timed out, control returns to step S1118 and end of pairing is awaited. If the timer 2 has timed out, control proceeds to step S1121 and a warning message such as "PAIRING COULD NOT BE ENDED. PLEASE DISCONNECT CABLE." is displayed on the display device 416 of the wireless adapter 202. This warning message is displayed in a case where residual battery power falls below an amount sufficient for processing during the course of pairing, resulting in incomplete processing.

Further, if it is found at step S1118 that pairing has ended, control proceeds to step S1122. Here a message such as "PAIRING HAS ENDED. PLEASE DISCONNECT CABLE." This is a basic message in a case where pairing has ended normally.

If it is found at step S1112 that a pairing request has not been received, control proceeds to step S1113, where it is determined whether timer 1 awaiting receipt of a pairing request has timed out. If timer 1 has not timed out, control returns to step S1101. If timer 1 has timed out, then control proceeds to step S1120, where a warning message such as "PLEASE CHECK DEVICE STATUS AND DISCONNECT CABLE." is displayed on the display device 416 of the wireless adapter 202. This occurs in a case where a device entirely unrelated to the digital camera 800 has been connected to the USB host connector 410 of the wireless adapter 202.

Thus, when processing of any of steps S1120 to S1122 ends, control proceeds to step S1124, where it is determined whether the wireless state is notification in progress. If the answer is "NO", control proceeds to step S1126 as is. If the answer is "YES", then control proceeds to step S1125, at which the status of the device is changed from BUSY to IDLE. Then, at step S1126, it is determined whether the data signal line of the USB host connector 410 is at the low level in order to verify that the USB cable 801 has been disconnected. If the data signal line falls to the low level, then processing is exited.

It may be so arranged that the warning message displayed at the end of pairing is displayed when password authentication has failed in a case where entry of a password prompted.

The embodiments described above are such that when a wireless adapter and digital camera perform pairing, only connection control is suppressed without temporarily halting radio in a case where pairing has been requested from another wireless device. As a result, by having a digital camera that is desired to be connected wirelessly monitor a change in status (BUSY→IDLE) by polling, it is possible to curtail re-connection time necessary up to construction of the wireless network, e.g., "network scanning, network participation, IP address allocation and device search", and the time it takes until printing can be performed next can be shortened.

Further, in the embodiments described above, the device status is set to BUSY before a pairing request is received. Although this is advantageous in that a digital camera desired to be connected wirelessly can promptly ascertain the BUSY status of the wireless adapter and printer, there is the possibility that a BUSY determination will be made even in a case where a device other than a digital camera has been connected by a USB.

Further, in a case where device status has been set to BUSY after receipt of a pairing request, notification of BUSY can be given reliably. However, the BUSY determination takes time. As a consequence, in a case where it takes a considerable length of time until receipt of the USB pairing request from the status of the data signal line of the USB host connector, there is a possibility that a wireless connection will be allowed from a digital camera after a device-information inquiry has been responded to with IDLE.

In actuality, however, this series of times represent a time that almost approximates error in terms of user operation. Therefore, by providing timer 1 such as in the foregoing embodiments, it is possible to quickly sense error in a case where a device other than the above-mentioned digital camera has been connected by a USB.

Further, in the first to fourth embodiments, the adhoc mode of a wireless LAN compliant with IEEE 802.11x has been described as an example of a wireless communication scheme. However, the present invention is applicable also to other wireless communication schemes such as the infrastructure mode, Bluetooth (registered trademark), UWB and WiMAX.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes read from the recording medium implement the novel functions of the embodiments and the recording medium storing the program codes constitutes the invention.

Examples of recording media that can be used for supplying the program code are a floppy disk, hard disk, optical disk, magneto-optical disk, CD-ROM, CD-R, magnetic tape, non-volatile type memory card or ROM, etc.

Further, besides the case where the aforesaid functions according to the embodiments are implemented by executing the program codes read by a computer, it goes without saying that the present invention covers a case where an operating system or the like running on the computer performs a part of or the entire actual process in accordance with the designation of program codes and implements the functions according to the embodiments by such processing.

It goes without saying that the present invention further covers a case where, after the program codes read from the recording medium are written in a memory provided on a function expansion board inserted into the computer or provided in a function expansion unit connected to the computer, a CPU or the like contained in the function expansion board or function expansion unit performs a part of or the entire actual process in accordance with the designation of program codes and implements the functions of the above embodiments by such processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-073953 filed on Mar. 15, 2005, which is hereby incorporated by reference herein in its entirety.

What is claimed is:

1. A communication apparatus having a wired communication interface and a wireless communication interface, comprising:
    a wireless connection unit adapted to wirelessly connect to a first communication device by the wireless communication interface, in accordance with a type of a signal received from the second communication device via the wired communication interface;
    a disabling unit adapted to disable wired communication with a second communication device via the wired communication interface, until the communication apparatus wirelessly connects to the first communication device by the wireless connection unit, in accordance with the type of the signal received from the second communication device via the wired communication interface;
    an enabling unit adapted to enable the wired communication with the second communication device, which has been disabled by the disabling unit, in response to success of the wireless connection to the first communication device by the wireless connection unit; and
    a relaying unit adapted to relay data communication between the wired communication with the second communication device via the wired communication interface and the wireless communication with the first communication device via the wireless communication interface after enabling the wired communication with the second communication device by the enabling unit.

2. The communication apparatus according to claim 1, further comprising:
    a reception unit adapted to receive wireless communication information for connecting to a wireless network from the second communication device via the wired communication interface in accordance with the type of the signal received from the second communication device via the wired communication interface,
    wherein the communication apparatus selectively performs any one of the disabling the wired communication with the second communication device by the disabling unit and the receiving the wireless communication information by the reception unit, in accordance with the type of the signal received the second communication device via the wired communication interface.

3. The communication apparatus according to claim 1, wherein the type of the signal differs by a type of the second communication device that has been connected by the wired communication interface.

4. The communication apparatus according to claim 2, further comprising:
    a setting unit adapted to set the wireless communication information, received by the reception unit from the second communication device via the wired communication interface, for connecting to a wireless network.

5. The communication apparatus according to claim 1, further comprising a sending unit adapted to, when the wireless communication with the first communication device ends, send a signal indicating that the communication apparatus is participating in the wireless network via the wireless communication interface,
    wherein the disable unit disables the wired communication with the second communication device when the wireless communication with the first communication device ends.

6. The communication apparatus according to claim 1, wherein when wireless communication with the first communication device by the wireless communication interface cannot be established, a controller of the communication device is operated in a low power consumption mode and the wired communication with the second communication device is disabled.

7. A communication method in a communication apparatus having a wired communication interface and a wireless communication interface, comprising the steps of:
    connecting the communication apparatus wirelessly to a first communication device by the wireless communication interface, in accordance with a type of a signal received, via the wired communication interface, from a second communication device;
    disabling wired communication of the communication apparatus with the second communication device via the wired communication interface, until the communication apparatus wirelessly connects to the first communication device, in accordance with the type of the signal received from the second communication device via the wired communication interface;
    enabling the disabled wired communication of the communication apparatus with the second communication device in response to the wireless connection of the communication apparatus to the first communication device being successfully established; and
    performing data communication between the wired communication with the second communication device via the wired communication interface and the wireless communication with the first communication device via the wireless communication interface after enabling the wired communication with the second communication device.

8. A computer readable storage medium storing a computer program code for causing a computer to execute the communication method set forth in claim 7.

* * * * *